(12) United States Patent
Van Den Berg

(10) Patent No.: US 8,582,208 B2
(45) Date of Patent: Nov. 12, 2013

(54) METHOD AND APPARATUS FOR MANUFACTURING A SECURITY DOCUMENT COMPRISING A LENTICULAR ARRAY AND BLURRED PIXEL TRACKS

(75) Inventor: Jan Van Den Berg, Gouda (NL)

(73) Assignee: Sagem Identification bv, Haarlem (NL)

( * ) Notice: Subject to any disclaimer, the term of this patent is extended or adjusted under 35 U.S.C. 154(b) by 594 days.

(21) Appl. No.: 12/641,671

(22) Filed: Dec. 18, 2009

(65) Prior Publication Data

US 2011/0149405 A1 Jun. 23, 2011

(51) Int. Cl.
*G02B 27/10* (2006.01)
*G03B 21/60* (2006.01)

(52) U.S. Cl.
USPC .......................................... 359/626; 359/455

(58) Field of Classification Search
USPC ................. 359/626, 618–621, 443, 454–455;
264/1.1, 1.32, 2.7; 457/162, 164, 165,
457/226, 227, 553, 554, 555
See application file for complete search history.

(56) References Cited

U.S. PATENT DOCUMENTS 6,329,987 B1 * 12/2001 Gottfried et al. .............. 345/419
7,480,100 B1    1/2009 Raymond et al.

FOREIGN PATENT DOCUMENTS

WO    WO 2006137738 A2 * 12/2006

* cited by examiner

*Primary Examiner* — Dawayne A Pinkney
(74) *Attorney, Agent, or Firm* — Young & Thompson

(57) ABSTRACT

A method of manufacturing a display device, in particular a security document, includes providing m images of an object, wherein m is at least equal to 2, dividing each image into n sets adjacent arrays $(l_{1,1}, l_{1,2} \ldots l_{1,n}), \ldots, (l_{m1}, l_{m2}, \ldots l_{mn})$ of picture elements, spaced at a mutual distance $\delta$, applying the images in an interlaced manner on an image layer in sets of interlaced arrays $(l_{11}, l_{21} \ldots l_{m1}), \ldots, (l_{1n}, l_{2n} \ldots l_{mn})$ below a lens structure having line-shaped lens elements over the image layer with one line shaped lens element overlying a corresponding set of adjacent arrays, wherein upon applying the arrays onto the image layer, and/or upon providing the lens elements, each array of picture elements is provided onto the image layer in an out of focus manner to form a blurred array or each array is imaged by the lens elements to form a blurred array, wherein a mutual distance of the edges of adjacent blurred arrays is smaller than the mutual distance $\delta$.

12 Claims, 5 Drawing Sheets

150 μm

200 μm

250 μm

300 μm

METHOD AND APPARATUS FOR MANUFACTURING A SECURITY DOCUMENT COMPRISING A LENTICULAR ARRAY AND BLURRED PIXEL TRACKS

FIELD OF THE INVENTION

The invention relates to a method of manufacturing a display device, in particular a security document, comprising the steps of:
   providing m images of an object, wherein m is at least equal to 2,
   dividing each image into n sets adjacent arrays ($l_{11}, l_{12} \ldots l_{1n}), \ldots, (l_{m1}, l_{m2}, \ldots l_{mn})$ of picture elements, spaced at a mutual distance $\delta$
   applying the images in an interlaced manner on an image layer in sets of interlaced arrays ($l_{11}, l_{21} \ldots l_{m1}), \ldots, (l_{1n}, l_{2n} \ldots l_{mn})$ below a lens structure comprising line-shaped lens elements over the image layer with one line shaped lens element overlying a corresponding set of adjacent arrays.
The invention also applies to an apparatus for manufacturing such a display device and to a display device comprising a lenticular lens array.

BACKGROUND OF THE INVENTION

Such a method is known from U.S. Pat. No. 7,480,100 in which it is disclosed to apply a number of interlaced pictures onto the image layer of a lenticular structure for displaying three-dimensional, animated and other images. The lenticular structure may comprises a number of line-shaped lenses. A number of 10-30 interlaced images is formed and the pixel tracks of these images are interlaced and printed below the lenses with the pitch of the lens system such that one set of interlaced pixel tracks may be located each time below a single line-shaped lens. Depending on the angle of viewing, one of the interlaced images is observed by the viewer, and by tilting the lenticular structure, different images are viewed.

In a favourable embodiment, the images on the lenticular structure may comprise multiples of two portraits of a person taken at different angles, which are interlaced such that sets of two images are produced that are separately viewed by each respective eye of a viewer at a range of viewing distances of for instance 20-100 cm. In this manner a stereoscopic effect is achieved through the range of viewing distances.

The interlaced images may be printed on a substrate, for instance polycarbonate, where after the line-shaped lens structure may be applied over each set of interlaced pixel tracks using a die or mould. Alternatively, the lens structure is first formed and the interlaced images are subsequently written onto the substrate by means of a scanning optical beam, such as a laser.

A disadvantage of using a number of interlaced images is that upon viewing these images via the lenticular device, patterns of dark shading appear to run across the image when changing the angle of view. This produces an unstable visual effect which especially for the use of the lenticular device as a security device hinders accurate and reliable identification.

It is hence an object of the invention to provide a lenticular device in which the above effect is reduced. It is another object of the invention to provide a lenticular device which is especially suitable for producing accurate and reliable identity or security document.

SUMMARY OF THE INVENTION

Thereto the method according to the invention is characterised in that upon applying the arrays into the image layer, and/or upon providing the lens elements, each array of picture elements is provided onto the image layer in an out of focus manner to form a blurred array or each array is imaged by the lens elements to form a blurred array, wherein a mutual distance of the edges of adjacent blurred arrays is smaller than the mutual distance $\delta$.

The pixel tracks can be processed in a digital processor to be blurred so that their width increases and the spacing between adjacent pixel tracks is reduced. Preferably, the pixel tracks will increase in width such that edges of neighbouring pixel tracks touch. Alternatively, the pixel tracks may be projected onto the image layer via a lens in an out of focus manner to cause the broadening of the blurred pixel tracks.

Preferably the pixel tracks are be applied to the image layer via the lens structure of the overlying lenticular lens array in an out-of focus manner. This may be achieved by placing the lens array over the image layer at a distance which differs from the focal length of the lenticular lens system for the laser at the wavelength of the laser for the refractive index of the material of the lenticular array (e.g. polycarbonate). It was surprisingly found that the out-of focus effect of the pixel tracks has no negative impact on the observed sharpness of the picture while the variation in light intensity of the image upon viewing at different angles is strongly reduced. Hence, the blurring technique results in improved lenticular images and allows production of accurate and reliable lenticular security/identity images.

In a preferred embodiment, the arrays of picture elements are provided on the image layer by projection or scanning an optical beam onto the lens elements and focussing the beam by said lens elements onto the image layer, wherein a distance H between the image layer and the lens elements is different from the focal length of the lens elements by at least 5%, preferably at least 10%, more preferably at least 20%.

The increase in width caused by applying the arrays in an out of focus manner may comprise between 5% and 100%, preferably between 5% and 50%, more preferably between 5% and 30% and most preferably between 5% and 15%. For producing a sharp and stable interlaced image, the edges of adjacent blurred arrays may be substantially touching.

Another option for obtaining blurred pixel tracks is using lens elements on the display device which are roughened to cause dispersion of light while applying the pixel tracks.

Another option for obtaining blurred pixel tracks is to first produce in-focus pixel tracks onto the image layer and subsequently treating the lens elements (by roughening) to cause dispersion of light upon viewing and hence producing broadened pixel tracks.

A suitable device for producing a security document comprises an optical beam generator, a substrate carrier, a scanning device for scanning an optical beam across an image layer on the substrate carrier in a line pattern and a control unit for controlling the optical beam generator for scanning the beam across an image layer on the substrate carrier, and a tilting drive for tilting the substrate carrier around an axis extending substantially transversely to the optical beam. The control unit is adapted to form blurred interlaced pixel arrays that can be written into a substrate placed on the substrate carrier such that a mutual distance of the edges of adjacent blurred pixel arrays is smaller than the mutual distance $\delta$.

The image layer may comprise a polycarbonate layer over which the lenticular structure has been formed. The laser is scanned across the lens structure in a line pattern and is imaged by the lenticular array onto the image layer in an out of focus manner to form (blurred) pixel tracks where it produces light and dark pixels by locally carbonising the image layer. The substrate table tilts the substrate each time through a small angle such that an image is formed for each tilting angle.

BRIEF DESCRIPTION OF THE DRAWINGS

Some embodiments of a method and device according to the present invention will by way of non-limiting example be explained in detail with reference to the accompanying drawings. In the drawings.

DETAILED DESCRIPTION OF THE INVENTION

Figure 1:
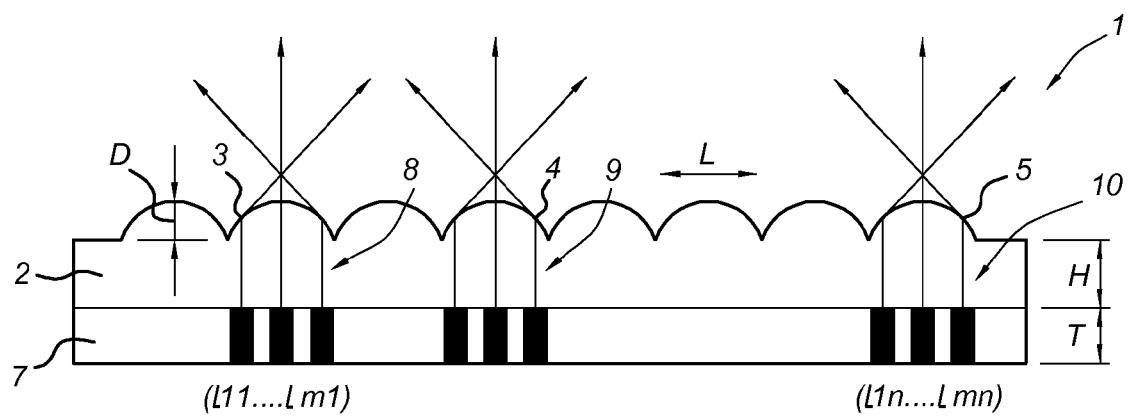
FIG. 1 shows a schematic cross-sectional view of a known lenticular structure.

FIG. 1 schematically shows a known lenticular display device or image carrier 1, for instance for use in security documents such as passports, identification cards, driver's licenses, banking cards, visa stickers etc. The image carrier 1 comprises a substrate 2 having at a top side an array of n line-shaped lens elements 3,4,5 at the surface of the substrate 2. The number of lens elements n may for instance comprise 325 lens elements per inch. In an image layer 7 of the substrate 2, situated below the lens elements 3-5, sets 8,9,10 of interlaced image lines or "pixel tracks" have been applied to image layer 7, for instance by means of printing or laser engraving. In the embodiment shown, the sets of lines 8-10 comprise vertical areas of carbonised image layer material (for instance polycarbonate) at the points in which a laser beam is focussed by the lens elements 3-5 onto the image layer 7. By focussing the laser beam during writing via the lens elements 3-5, the interlaced images formed by sets of lines 8-10 are exactly in register with the lens elements 3-5.

Each set 8-10 of pixel tracks $(l_{11}, l_{12} \ldots l_{1n}), \ldots, (l_{m1}, l_{m2}, \ldots l_{mn})$ comprises m tracks, wherein m may comprise between 2 and about 60 (for reasons of simplicity only three image lines per set are shown). Each pixel track in a set is imaged by a single overlying lens element 3-5 in a predetermined direction. A viewer looking at the image carrier 1 at a specific angle will ideally see per lens element 3-5 one pixel track, say pixel track v, $l_{1v}, l_{2v} \ldots l_{mv}$ in each set $(l_{11} \ldots l_{m1})$, $(l_{21} \ldots l_{m2}), \ldots, (l_{1n} \ldots l_{mn})$ of pixel tracks. By tilting the image carrier 1 relative to the viewer, different images can be viewed in this way.

It is also possible that for each set of pixel tracks $(l_{11} \ldots l_{m1}), \ldots, (l_{1n} \ldots l_{mn})$, 2 lines are imaged by each lens 3-5 at a position corresponding to the position of the eyes of an observer, such that each eye observes a different image and a stereoscopic overall picture is observed. Multiple pairs of such stereoscopically matching pixel tracks in each set may be provided, corresponding to a stereoscopic image at different viewing distances. This has been described in detail in European patent application EP 1 874 557, the contents of which are incorporated herein by reference.

Figure 2:
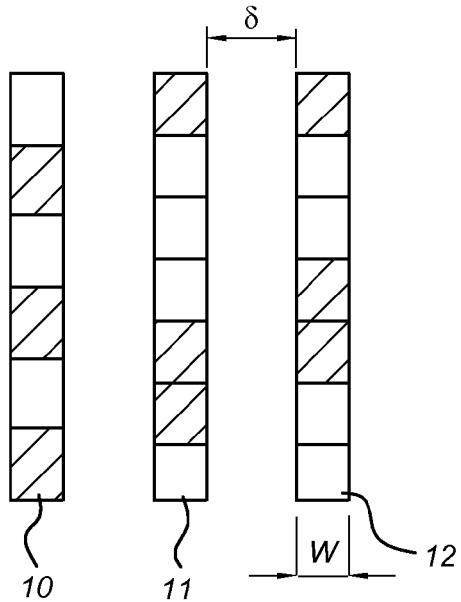
FIG. 2 shows a top view of three adjacent interlaced pixel tracks.

The height H of the substrate 2 may for instance be about 250 μm, the thickness T of the image layer 7 may for instance be 50 μm. The width L of a lens element may be for instance 75 μm and a height D may be about 10 μm. As shown in FIG. 2, the pixel tracks 10,11,12 in prior art image carriers may have a width w of about 15 μm and are arranged in parallel with a mutual spacing δ of about 1 μm.

Figure 3:
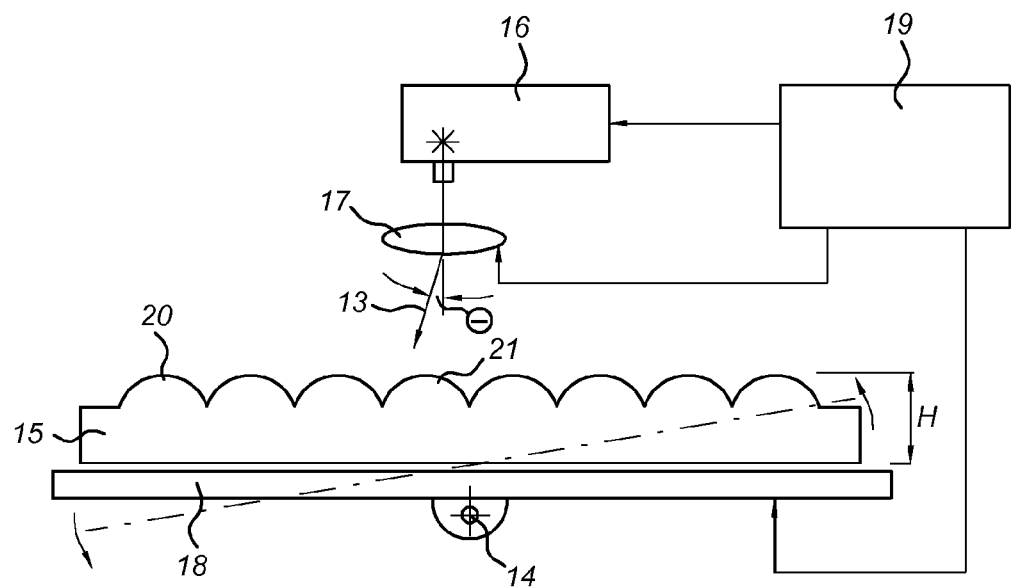
FIG. 3 shows a schematic lay-out of an embodiment of a device for producing an interlaced image in a lenticular structure according to the invention.

In FIG. 3 an embodiment of a device for laser engraving interlaced images onto image carrier 15 is shown, comprising a laser 16, an optical element such as a lens 17, or collimator or deflecting mirror, a substrate table 18 and a control unit 19. The control unit 19 controls the laser 16 and/or lens 17 to write pixel tracks through each lens element 20, 21 into the underlying image layer of the image carrier 15. Then the substrate table 18 may be tilted around an axis 14, extending perpendicular to the plane of the drawing, to a predetermined angle, and a second pixel track in each set is applied, until m pixel tracks per set are engraved. The angles of tilt θ of the laser beam 13 may for instance be 6°,2°,-2° and -6° when writing sets of four pixel tracks for producing a stereoscopic image. During writing, the laser is deflected to scan in a line pattern across the image carrier 15 by means of suitable deflection devices (e.g. a mirror) and is focussed via a lens 17.

According to one embodiment of the invention, the focus of the lens 17 may for instance be adjusted such that the pixel tracks are written onto the substrate of the image carrier 15 in an out-of focus manner, such that the spacing δ between two adjacent pixel tracks in a set, is decreased. Alternatively, the lens 17 may cause an in-focus projection or may be a scanning device causing a scanning movement of the pixel tracks onto the substrate of the image carrier 15, while in the control unit 19 the pixel tracks have been digitally processed to produce blurred pixel tracks.

Figure 4:
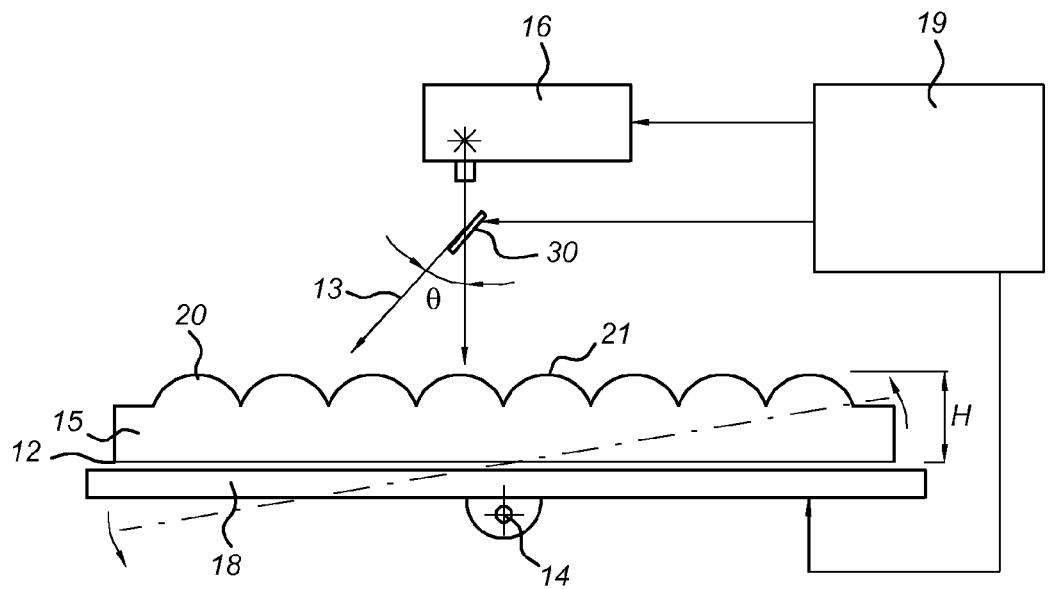
FIG. 4 shows a schematic lay-out of a preferred embodiment for laser engraving an interlaced image in an out-of focus lenticular structure according to the invention.

FIG. 4 shows a preferred embodiment of device for laser engraving interlaced images onto image carrier 15. The laser beam 13 is deflected by a mirror 30 and is scanned across the surface of the image carrier 15. For producing a sharp image on the image layer 12, this image layer 12 should be in the focal point of the lens elements 20, 21. The focal length f of the lens elements 20,21 is given by the formula:

$$f = nr/(n-1)$$

Figure 5A:
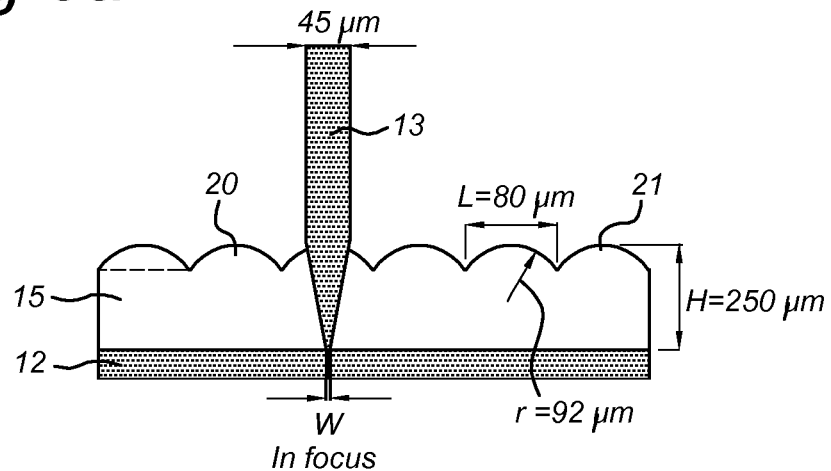
FIGS. 5a and 5b show a cross-sectional view of a lenticular lens array projecting a laser beam onto an image layer in a focussed and out-of focus manner, respectively.
Figure 5B:
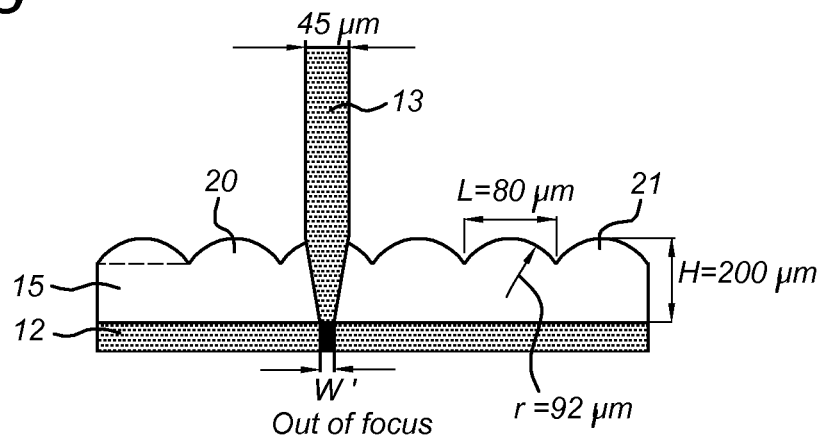

Herein is n the refractive index, which for polycarbonate at a laser wavelength of 1064 nm is about 1.56 and r is the radius of the lens elements, for instance 92 μm. This results in a focal length f in polycarbonate of about 256 μm, so that for in focus writing, the height H of the substrate 15 should be about equal to this length, the situation which is shown in FIG. 5a for H=250 μm. The laser beam is focussed onto the image layer 12 and is reduced in diameter from a beam width of about 45 μm to a focussed width of w of about 15 μm. By choosing now, according to the invention and shown in FIG. 5b an image carrier 15 for which the height H differs from the in-focus height of the 250 μm, broadened out-of focus pixel tracks can be formed with an out-of focus width w' of for instance 16 μm-30 μm.

Figure 6A:
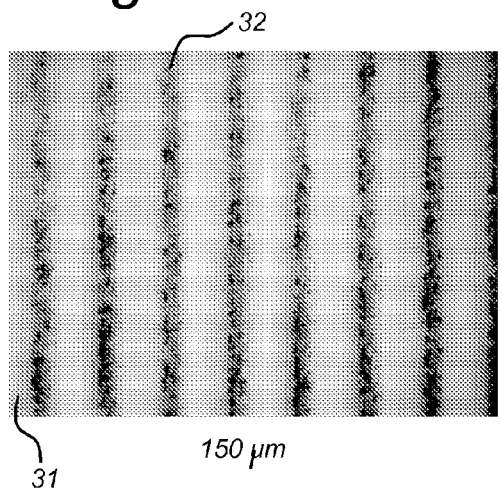
FIGS. 6a-6d show pixel tracks produced by laser engraving at different heights of the lens array.
Figure 6B:
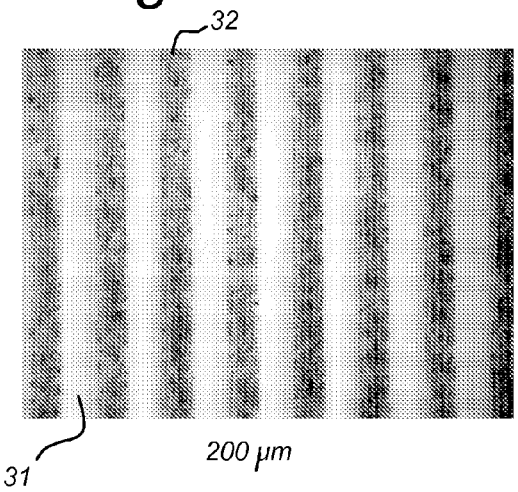
Figure 6C:
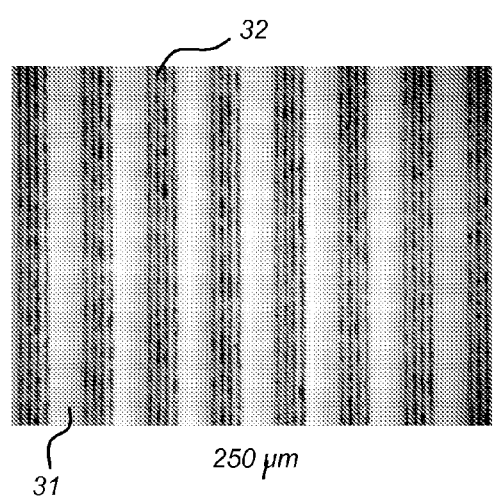
Figure 6D:
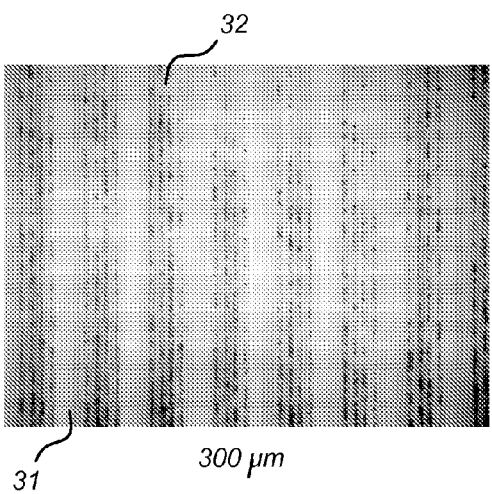

FIG. 6a shows an image of sets 31, 32 of four blurred pixel tracks each for a height H of 150 μm, causing an out-of focus broadening such that no open space is present between adjacent pixel tracks. In FIG. 6b, the height H is taken at 200 μm such that a slightly more sharp image of the pixel tracks is produced at a mutual spacing, and FIG. 6c shows a sharp image of sets of pixel tracks 31, 32 at a height H of 250 μm. In FIG. 6d sets 31, 32 of blurred pixel tracks are produced at a height H of 300 μm. The images of FIGS. 6a-6d were taken by neutralising the lens effects of lenses 20,21 by applying an immersion liquid onto the image carrier with a refractive index equal to the index of the substrate 15. It can be concluded that by laser engraving of the pixel tracks above the focal point of the laser 13 in FIGS. 6a and 6b, out of focus broadened pixel tracks are formed. With the laser sensitive image layer 12 at a thickness H of the substrate of 200 μm a very good and stable 3D photograph can be produced. With a thickness H of 150 μm, such as shown in FIG. 6a, the pixel tracks overlap, which results in a poorer D image. At a thickness H of 300 μm, such as shown in FIG. 6d, a much lighter D image could be produced with a reduced restless appearance upon tilting of the viewing angle.

Figure 7:
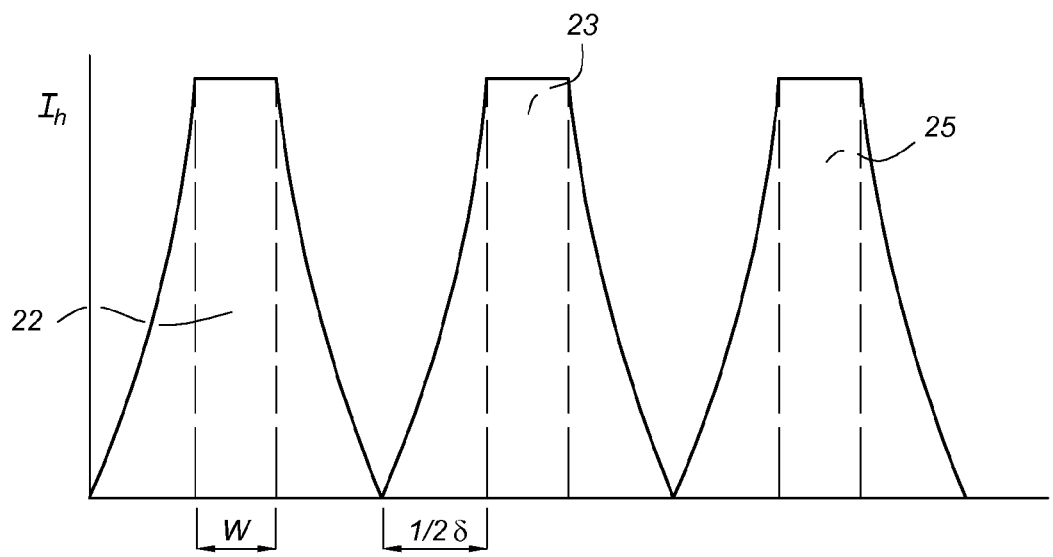
FIG. 7 and FIG. 8 show schematic intensity profiles of blurred interlaced pixel tracks according to the invention.

As is shown in FIG. 7, which gives the intensity values for a number of adjacent pixel tracks 22,23, 25, the width w of the straight-sided pixel tracks 22, 23, 25 is increased by the interspacing distance δ caused by the out-of focus imaging of these pixel tracks onto the image layer, such as is the case for instance in FIG. 6b. Hereby the intensity of the pixel tracks is no longer a step-function but shows a gradual decrease from the maximum intensity value $I_h$ to a lower level $I_1$ over the distance 0.5 δ.

Figure 8:
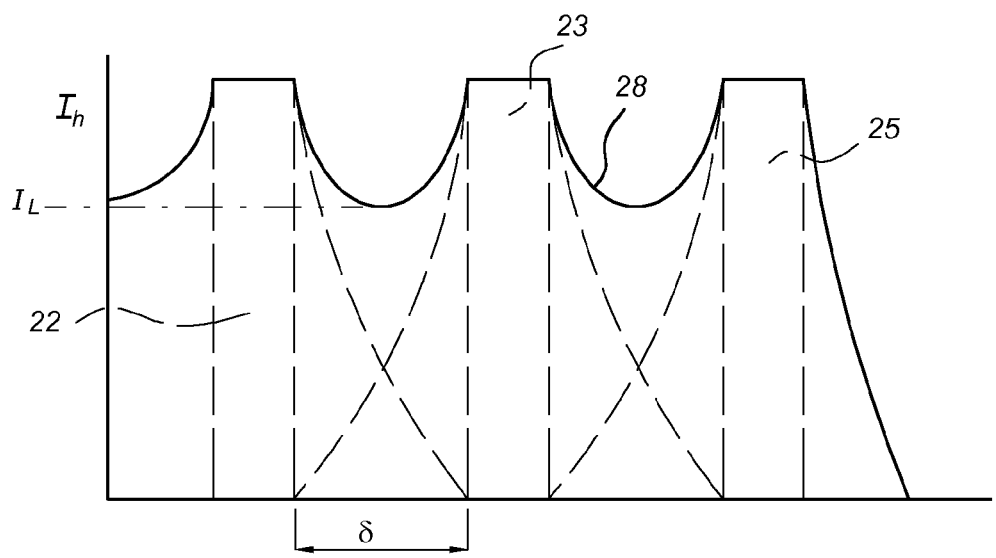

As shown in FIG. 8, the out-of focus is such that the width of each pixel track 22,23,25 is increased in width by so that adjacent pixel tracks now show some overlap and the intensity value is given by curve 28, such as shown in FIG. 6a. It was found that the effect of shadows moving across the image when tilting it with respect to the viewer, as occurs at a spacing of the pixel tracks shown in FIG. 2, can be strongly reduced by producing out of focus pixel tracks according to the invention, while the observed sharpness of the interlaced image for a viewer is maintained.

It should be noted that, although the invention has been described with reference to laser engraving to provide the pixel tracks in the display device according to the invention, the invention can also be applied when sets of pixel tracks are printed or projected on a polycarbonate substrate of a lenticular array, where after the lens elements are formed by means of a heated mould.

The invention claimed is:

1. A method of manufacturing a display device, the display device being a security document, the method comprising:
   providing m images of an object, m being at least equal to 2;
   dividing each image into sets of adjacent arrays of picture elements, spaced at a mutual distance;
   applying the images in an interlaced manner on an image layer in sets of interlaced arrays below a lens structure comprising line-shaped lens elements over the image layer with one line-shaped lens element overlying a corresponding set of adjacent arrays by printing or by projection or scanning an optical beam,
   wherein upon applying the arrays onto the image layer and/or upon providing the lens elements, each array of picture elements is provided onto the image layer in an out-of-focus manner to form a blurred array or each array is imaged by the lens elements to form a blurred array, a mutual distance of edges of adjacent blurred arrays being smaller than the mutual distance by which the adjacent arrays of picture elements are spaced, an increase in width of the arrays caused by applying the arrays in the out-of-focus manner comprising between 5% and 100%.

2. The method according to claim 1, wherein the scanned optical beam is focused by said lens elements onto the image layer, and
   wherein a distance between the image layer and the lens elements is different from the focal length of the lens elements by at least 5%.

3. The method according to claim 1, wherein the array of picture elements is provided onto the image layer in an out-of focus manner by means of printing.

4. The method according to claim 1, wherein the edges of adjacent blurred arrays are substantially touching.

5. A display device comprising an array of lens elements overlying an image layer with sets of pixel tracks produced by the method according to claim 1.

6. An apparatus according to claim 1, wherein the optical beam generator comprises a laser.

7. The method according to claim 1, wherein the mutual distance of the edges of adjacent blurred arrays is smaller than the mutual distance by which the adjacent arrays of picture elements are spaced such that an overlap occurs between the adjacent blurred arrays.

8. The method according to claim 1, wherein the increase in width of the arrays caused by applying the arrays in the out-of-focus manner comprises between 5% and 50%.

9. The method according to claim 8, wherein the increase in width of the arrays caused by applying the arrays in the out-of-focus manner comprises between 5% and 30%.

10. The method according to claim 9, wherein the increase in width of the arrays caused by applying the arrays in the out-of-focus manner comprises between 5% and 15%.

11. The method according to claim 2, wherein the distance between the image layer and the lens elements is different from the focal length of the lens elements by at least 10%.

12. The method according to claim 11, wherein the distance between the image layer and the lens elements is different from the focal length of the lens elements by at least 20%.

* * * * *